United States Patent [19]
Norris et al.

[11] Patent Number: 5,920,828
[45] Date of Patent: Jul. 6, 1999

[54] QUALITY CONTROL SEISMIC DATA PROCESSING SYSTEM

[75] Inventors: Michael W. Norris, Cypress; Michael Hares, Houston; George Wood, Sugar Land, all of Tex.

[73] Assignee: Baker Hughes Incorporated, Houston, Tex.

[21] Appl. No.: 08/867,247

[22] Filed: Jun. 2, 1997

[51] Int. Cl.[6] .................................................. G06F 19/00
[52] U.S. Cl. ............................................. 702/14; 702/17
[58] Field of Search ................................. 702/14, 16, 17; 367/16, 19, 40, 71, 77

[56] References Cited

U.S. PATENT DOCUMENTS

| | | | |
|---|---|---|---|
| 3,806,864 | 4/1974 | Broding et al. | 367/77 |
| 4,493,063 | 1/1985 | Tims et al. | 367/77 |
| 4,979,152 | 12/1990 | Rialan et al. | 367/77 |
| 5,276,655 | 1/1994 | Rialan et al. | 367/77 |
| 5,497,356 | 3/1996 | Norton, Jr. et al. | 367/19 |
| 5,550,787 | 8/1996 | Rialan et al. | 367/77 |

*Primary Examiner*—Donald E. McElheny, Jr.
*Attorney, Agent, or Firm*—Alan J. Atkinson

[57] ABSTRACT

An automated quality control system for processing geophysical seismic data and positioning data from a marine navigation system. The invention includes a prospect data logger in communication with system components for accessing the seismic data, for coordinating seismic data processing, and for identifying and storing attribute data relevant to the seismic data and the positioning data. The prospect data logger is capable of storing data in a programmed format, and can be engaged with a display for illustrating data accessible to the prospect data logger. The prospect data logger is capable of automatically performing quality control functions such as checking seismic data and positioning data, of verifying the format of merged seismic and positioning data, of generating a command for indicating an event or for controlling another system component. The prospect data logger can verify storage tape quality immediately after data is inputted, and a record of events can be generated. Raw seismic data and positioning data is contemporaneously merged, the merged data can be monitored on a real-time basis, and data processing and quality control can be performed from remote terminals. The system uniquely provides real-time quality control operations sufficient to identify variables and events so that immediate system corrections can be made.

27 Claims, 3 Drawing Sheets

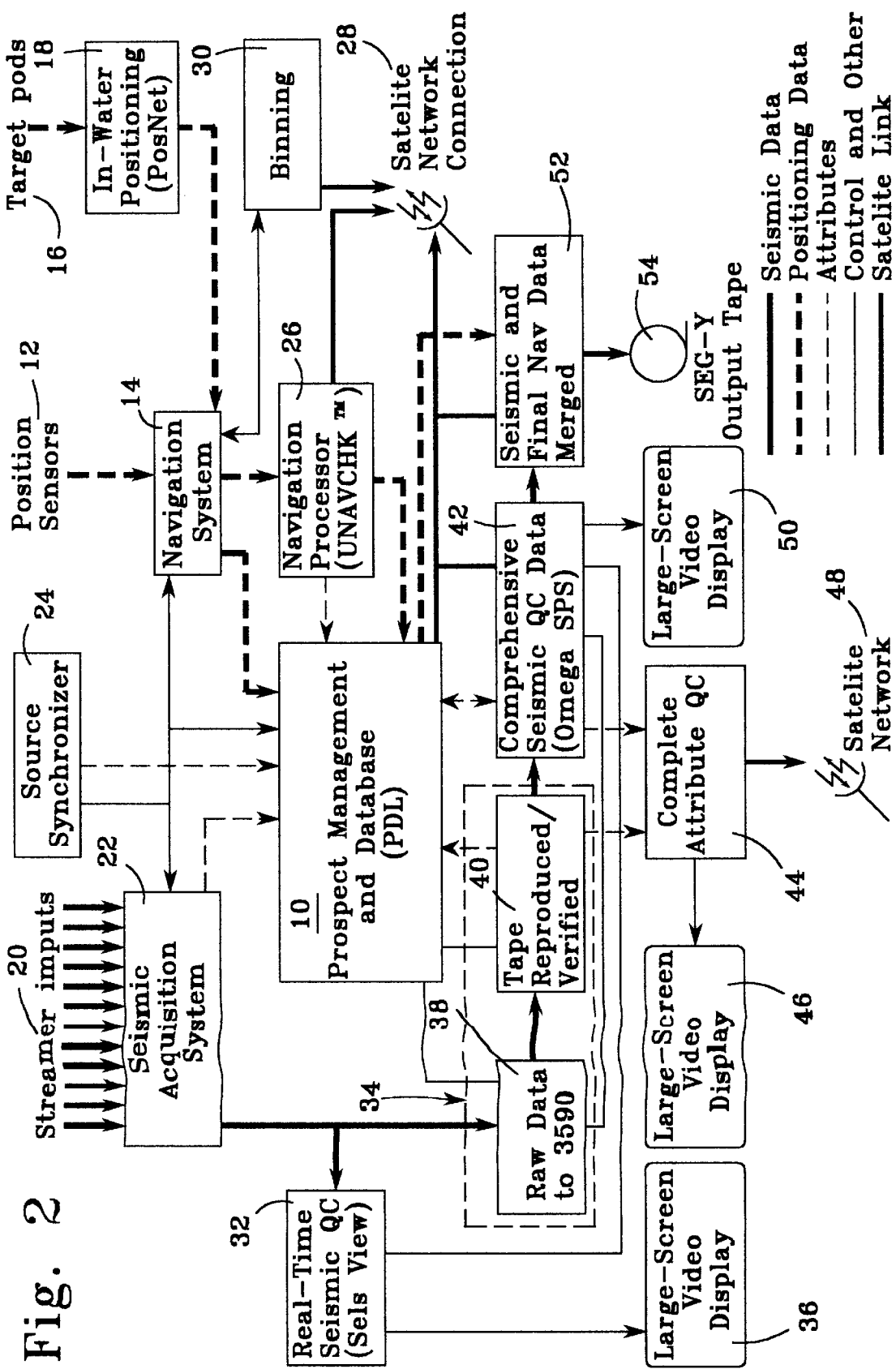

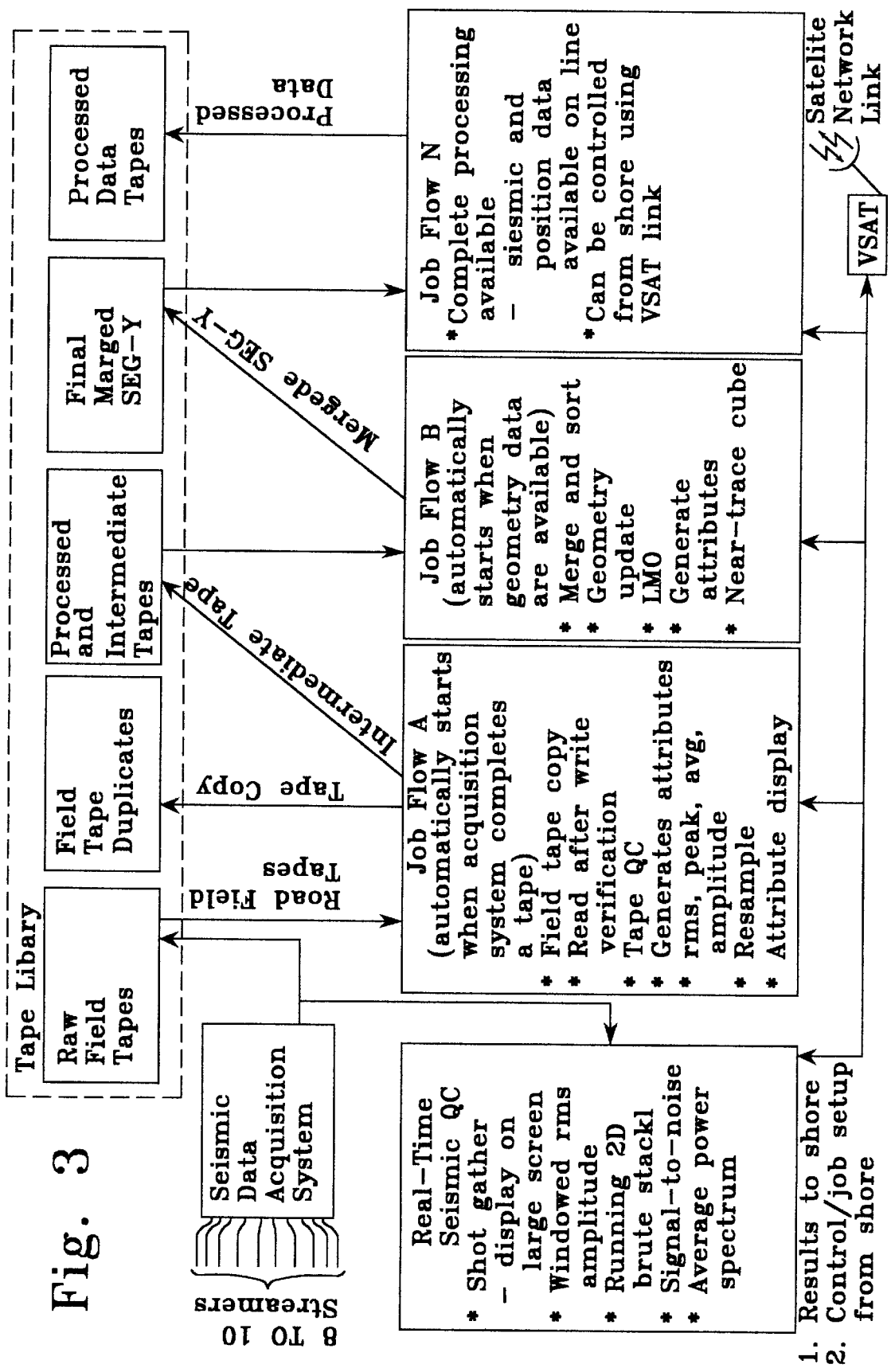

QUALITY CONTROL SEISMIC DATA PROCESSING SYSTEM

BACKGROUND OF THE INVENTION

The present invention relates to the field of geophysical seismic data collection. More particularly, the present invention relates to an integrated system for collecting, storing and processing seismic and navigation data from an exploration prospect, and for enhancing quality control of such data.

Marine seismic exploration investigates the geophysical structure of formations underlying water. A seismic source array is towed by a vessel through the water, and a sensor array detects signals generated by wave reflections from subsurface geologic formations. The seismic source array utilizes air guns or other multiple wave generators, and the sensor array typically utilizes hydrophones or other transducers. One or more seismic lines in the same geographic area define a survey, and a collection of one or more related surveys typically define an exploration prospect.

As the seismic source array passes over the exploration prospect, the source waves travel downward through the sea floor and the subsurface formations. Portions of the seismic wave energy are reflected back into the water by the sea floor and by interfaces between subsurface rock layers. The returning reflected waves generate pressure pulses, and the sensor array generates output signals representing such pressure pulses. The output signals are recorded on tapes and can be processed to identify certain relationships. For example, the propagation time of a seismic wave from a reflection point is proportional to the depth of the reflection point, and the processed output signals can be merged with position data to generate topographical representations of the subsurface formations.

Marine seismic data acquisition collects vast quantities of seismic and positioning data, and such data represents numerous parameters having multiple error sources. Wind, waves, and currents physically move the seismic streamers relative to the tow vessel in a "feathering angle" relative to the tow vessel heading. A relatively small feathering angle of five percent may offset a streamer point hundreds of meters from the survey line. Errors also occur due to the dispersal of the subsurface wave path reflection points, the occurrence of source and receiver offsets, the inclination of the reflecting surfaces, and because of other factors. The accuracy and usefulness of seismic data requires that multiple data processing procedures accurately locate the data points representing the seismic data.

Various data gathering systems collect and process seismic data. In U.S. Pat. No. 4,787,069 to Beauducel et al. (1988), electronic modules filtered and amplified signals near each seismic receiver, and an acquisition apparatus digitized, stored and multiplexed signals from the seismic receivers to a ship-based central control and recording device.

U.S. Pat. No. 4,635,237 to Benestad et al. (1987) disclosed a system for transmitting information between seismic data acquisition devices and a central receiver. Benestad et al. described how conventional seismic data acquisition systems have multiple electrical contacts and connectors which increase the probability of faults. Arbitrary faults due to an electronic malfunction were identified by a data selector which screened data before the data was entered into the data stream. An extra data transmission line was included for transmitting a data stream following a line break or short-circuit in one of the ordinary transmission lines, and a signal indicating the error was sent to a central control unit.

U.S. Pat. No. 4,561,073 to Aeter et al. (1985) disclosed a system for sorting seismic data in a marine survey by sorting the data into defined squares, and by evaluating the measurement results for each square. By categorizing the data into geographic squares, errors and deviations caused by wind and other conditions was evaluated before the entire data set was processed. If sufficient data for such geographic space was not received, additional seismic data for such geographic space could be acquired.

In U.S. Pat. No. 4,663,743 to Rampuria et al. (1987), a data transcriber system received data in a first medium and outputted the data in a second medium. The transcriber system permitted detection and correction of data errors. However, the system required significant operator intervention to set processing parameters, to choose transcription types and input modes, to view input parameters, to modify data, and to output the data.

In U.S. Pat. No. 4,759,636 to Ahern et al. (1988), surrogate seismic signals were produced from multiple selected channels on a real time basis to represent the detected seismic data. These surrogate signals were generated by sampling the multiplexed seismic signal at selected time intervals. The surrogate signals consolidated the data quantities transmitted to a central processor for processing and interpretation. The surrogate signals were further used to evaluate the data quality control and to evaluate and optimize data acquisition parameters.

U.S. Pat. No. 4,682,307 to Newman (1987) also sought to provide a real-time data processing system by reducing the processed data. A single seismic source and a single receiver produced single trace data for processing, thereby reducing the total volume of data processed.

The emergence of 3-D data seismic processing as a geophysical tool and of multiple, large streamer arrays towed behind seismic vessels results in additional data available for processing. Known processing systems that selectively sampled the data sets ignore much of the available data. Moreover, known processing systems do not provide comprehensive real-time processing and quality control capabilities for maintaining the integrity of the processed data. Accordingly, a need exists for an improved system that enhances contemporaneous processing capabilities and provides real-time and near real-time quality control over the source data and processed results.

SUMMARY OF THE INVENTION

The present invention provides a unique, automated quality control system for collecting geophysical seismic data from a seismic acquisition system, and for processing data from a marine navigation system. The invention includes a seismic data storage engaged with the seismic acquisition system for receiving and storing seismic data, a seismic data processor engaged with the seismic data storage for processing seismic data, a prospect data logger for accessing the positioning data and for coordinating seismic data processing and for identifying and storing attributes and data, and a terminal communicating with the prospect data logger for permitting commands to be transmitted to the prospect data logger.

In different embodiments of the invention, the system can include one or more displays for monitoring data on a real-time basis, processing commands can transmitted from remote locations through satellite network connections, and data processing procedures are automatically initiated when certain data becomes available within the system.

The method of the invention is practiced by collecting seismic data with a seismic acquisition system, by transmitting the seismic data to a seismic storage engaged with a seismic data processor and a prospect data logger, by collecting positioning data with a marine navigation system, by transmitting the positioning data to the prospect data logger, by operating the prospect data logger to identify and store attribute data relevant to the exploration prospect, and by automatically operating the prospect data logger when a selected data event is detected.

BRIEF DESCRIPTION OF THE DRAWINGS

FIG. 2 illustrates data flow and control through the seismic data gathering and processing system.

FIG. 3 illustrates a schematic view showing the flow of different jobs through a tape library.

DESCRIPTION OF THE PREFERRED EMBODIMENTS

Figure 1:
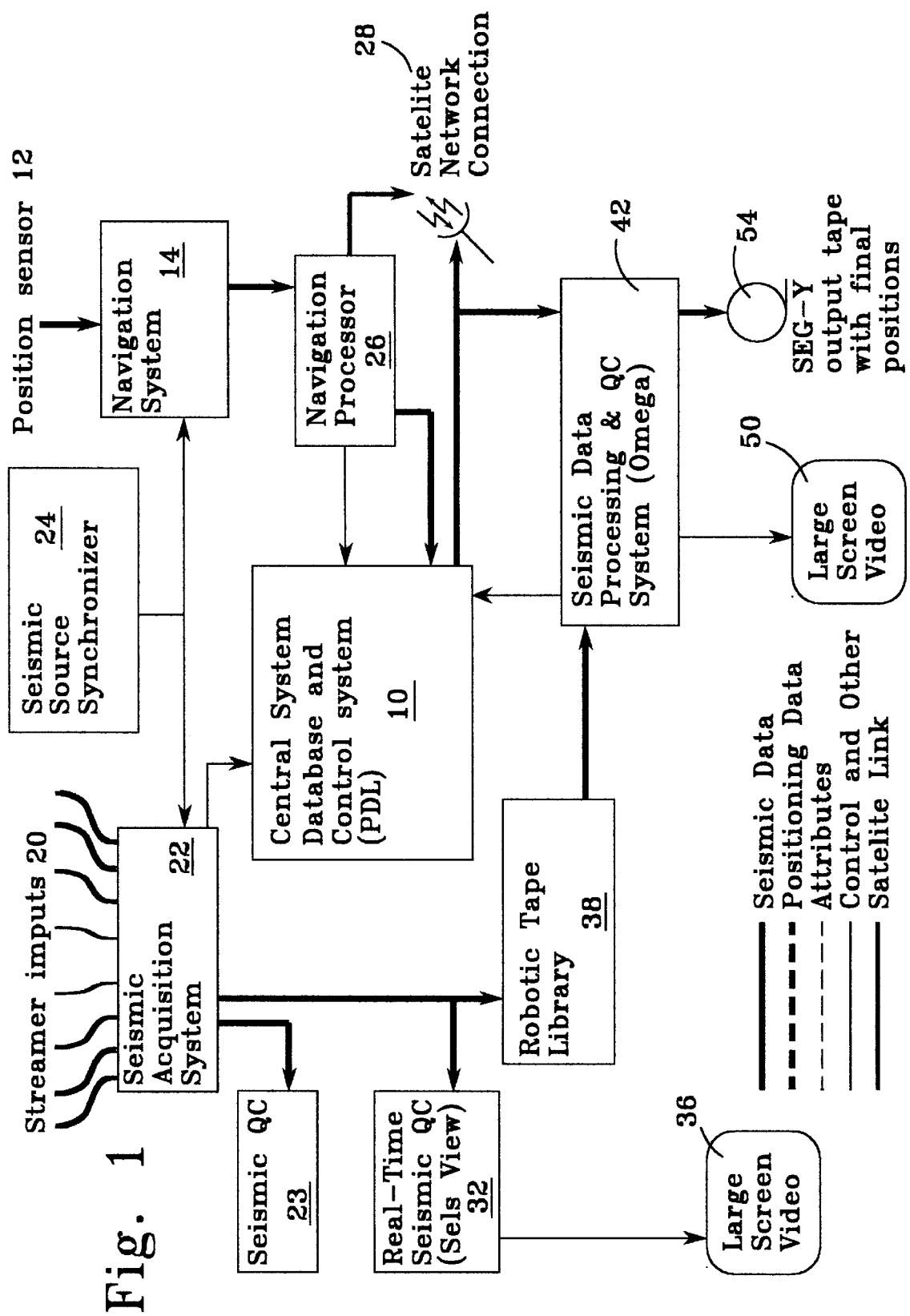
FIG. 1 illustrates a schematic view of a seismic data gathering and processing system.

The present invention provides an integrated data acquisition system for collecting and processing seismic data relevant to an exploration prospect. The unique system provides a fully automated marine data acquisition, navigation, and processing system which furnishes comprehensive quality control of seismic, navigation and attribute data. Although the system is applicable to land based use, to ocean bottom cable use, and to land/water transition zones, the system is particularly useful with a marine seismic vessel. The system provides fully automated tape handling from blank tape to the deliverable data outputs, permits one hundred percent read-after-write verification of high-density field tapes, and automatically initiates tape copy, quality control and processing steps when the relevant data is available. The system deliverables include but are not limited to raw data recording, duplicate field tapes, merged geometry, merged SEG-Y tapes, near trace cube, processed tapes, and video and graphic displays.

1. System Overview

FIGS. 1 and 2 illustrate schematic views describing certain subsystems and functional capabilities of the invention. The core of the system is prospect data logger (PDL) 10, which comprises an integrated onboard data management and quality control system for marine streamer operations. PDL 10 is also referred to as a "central system database and control system" as described below. PDL 10 can integrate all data acquisition and processing systems on a seismic vessel or other operating base. Survey configuration and shot data are automatically received in near real-time for quality control operations and for storage in a relational database management system. PDL 10 cooperates with other system components to provide certain functional capabilities described below.

FIG. 1 illustrates the relationship between major system components regarding the collection, processing and transmission of Seismic Data, Positioning Data, Attributes, Control Functions, and Satellite Communication Links. Certain system components can be transported by a seismic vessel (not shown) or can be located at land-based processing facilities. FIG. 2 illustrates the functional data transmission, processing and control functions among the various system components illustrated in FIG. 1. Specifically, FIG. 2 identifies the communication of Seismic Data, Positioning Data, Attributes, Control and other signals, and Satellite Link transmissions.

The system processes multiple seismic function modules to provide significant seismic processing flexibility, efficient processing capabilities, and enhanced quality control. Seismic function modules provide numerous capabilities in analysis, data editing, data enhancement and noise reject, de-convolution, displays, field tape, filters, gains, geometry, input/output, interactive set-up, sort/trace select, stacking, statics, utilities, velocities, velocity analysis, and 3-D capabilities.

Source data for the system in the form of Positioning Data and Seismic Data is provided through several different paths. Position sensors 12 provide Positioning Data to navigation system 14 regarding the vessel position and individual system components, and target pods 16 (FIG. 2) provide additional Positioning Data to in-water positioning network 18 (FIG. 2) regarding the relative location of other individual components within navigation system 14. Positioning Data is transmitted from network 18 to navigation system 14 for further processing as described below.

Multiple streamer inputs 20 provide raw seismic data to seismic acquisition system 22. Seis QC 23 monitors the quality control systems within seismic acquisition system 22 and provides for interactive real-tine control of seismic acquisition system 22. Source synchronizer 24 links navigation system 14 and seismic acquisition system to provide control signals between such components. Source synchronizer 24 also communicates with PDL 10 to transmit source Attributes to PDL 10.

Positioning Data from navigation system 14 is transmitted to PDL 10 and to navigation processor 26. Positioning Data and Attributes from navigation processor 26 are transmitted to PDL 10, and navigation processor 26 is connected to satellite network connection 28. In a preferred embodiment of the invention, all systems and major subsystems are accessible via satellite network connection 28 and via all related components of satellite network connection 28. Navigation system 14 is also connected through a control link with binning function 30 as shown, which in turn can be connected to satellite network connection 28 as shown in FIG. 2.

Seismic data from seismic acquisition system 22 is transmitted to SeisView 32 and to tape management system 34 illustrated in broken line form in FIG. 2. SeisView 32 provides real-time seismic quality control and is linked with display 36 for providing large screen video display of the Seismic Data and SeisView 32 processing. Tape management system 34 comprises a control function integrated within PDL 10 and includes tape library 38, described more thoroughly below, which is linked with tape reproduction and verification function 40. Tape management system 34 further includes a seismic data storage and controls the raw data, field copies, and intermediate and final processed tapes.

Seismic Data processing function 40 is conducted within Omega Seismic Processing System (Omega) 42. "Omega" is trademark of Western Geophysical Company, a division of Western Atlas International, Inc.). Attributes from processing function 40 and other parts of Omega 42 are transmitted to PDL 10 and to complete attribute function 44. Data from complete attribute function 44 is displayed on video display 46 and is transmitted to satellite network connection 48. Data from Omega 42 can be shown on video display 50.

Seismic Data from Omega 42 can be processed with data merger function 52 and can be transmitted to PDL 10 and to satellite network connection 28. Such Seismic Data can be further processed with Positioning Data from PDL 10 to merge the Seismic Data and the Positioning Data. Output from data merger function 52 can be transmitted to SEG-Y output tape 54, and a subset of such data can be transmitted through satellite network connection 28. In a preferred embodiment of the invention as described throughout this specification, "Omega" can include the composite functions and equipment identified as 40, 42 and 52.

Robotic tape library 38 stores and handles all field and processed tapes. Tape library 38 is modular and comprises tape drives and storage space that can be configured to fit different installations. A typical installation of tape library 38 comprises a two module unit having twelve tape drives and six hundred 3590 tapes. Certain tape drives can be dedicated to a data acquisition system while other tape drives copy, process and perform different functions. All data acquisition and tape copy functions are controlled by PDL 10, and processing applications for tape library 38 are controlled by a media management system within Omega 42.

Omega 42 provides interactive and batch processing functions for the Seismic Data, Positioning Data and Attributes, and furnishes preliminary seismic data processing for 2-D and 3-D surveys. Reduced data volumes of selected offsets can be processed and binned in near real-time to produce a 3-D cube. Omega 42 is a queue processing system where data flows through a user defined sequence of seismic functions, each of which provides a discrete geophysical operation to control or modify the data flow. Data flow operations include the input or output of data in a variety of formats, including trace selection, sorting and the branching and merging of separate processing paths. Omega 42 is capable of processing 2- and 3-D land, marine and transition zones, and full documentation on each seismic function module is available on-line or as hard copy.

Omega 42 provides maximum user flexibility in selecting the sequence of geophysical operations applied to seismic data processing. The interface for production processing provides a graphics flow editor and forms-driven parameter entry panels. The interface is driven dynamically by the seismic function documentation, thereby providing an interactive, data-driven processing interface. Seismic parameters are picked from the data displays and seismic processes can be applied incrementally. The full processing sequence is constructed in the background and can provide a record of the interactive data processes or can drive a batch processing task for a larger data quantity.

To test data and set geophysical parameters, full quality control processing is performed internally by Omega 42 on selected 2-D lines, and positioning accuracy can be verified by performing near offset analyses and LMO analyses. The Seismic Data can be processed through various stages with Omega 42, and the set-up for each job, quality control displays, and velocity analyses can be remotely viewed and controlled from remote facilities through satellite network connections 28 and 48.

Front-end main components of marine processing operations can be executed on board the vessel with merger function 52, resulting in SEG-Y output 54 which can be processed to include geometric spreading correction, deterministic deconvolution, re-sampling to four milliseconds, and merger of the Positioning Data.

SeisView 32 provides real-time quality control for Seismic Data. All or a portion of the Seismic Data can be viewed with display 36, and SeisView 32 is linked with Omega 42 to provide additional data processing options. Display 36 can graphically illustrate different data parameters or such parameters can be printed in hard copy form. Such parameters include shot gathers, windowed rms amplitude displays, running 2-D brute stacks, signal-to-noise information, average power spectrum of shot gather, and first break pick times versus calculated times. In addition, SeisView can store, display and plot trace attributes.

In-water positioning network 18 comprises a multi-target global positioning system that provides precision positioning information for in-water targets such as tail-buoys and source arrays. Small target pods 16 placed on tail-buoys and air gun floats provide raw positioning data observations to the vessel, and are combined with on-shore reference station data to compute accurate target position. If SARGAS™ reference station data with dual-band (L1/L2) are used, vessel and target positions can be identified within accuracy of one meter at distances up to one thousand kilometers from the reference station. Positions are computed relative to the seismic vessel using double-difference from code and carrier-phase raw data in separate Kalman filters. The position of sixteen or more targets can be computed each second, and the raw data is written on a disk that is accessible through the network.

Navigation processor 26 performs complete navigation post-processing, network calculations for complex sensor configurations, and multi-vessel, multi-cable, and multi-source 3-D survey quality control. Navigation processor 26 can comprise a fully integrated network solution for the entire network. Such system can use a fading memory filter to carry matrix and state vectors forward from a previous shot, and provides comprehensive statistical and position error reports and plots including measurements residuals, confidence error ellipses at ninety-five confidence interval, node movement analysis, cable separation and shape analysis, line-by-line summary statistics, network unit variance factor, network degrees of freedom, sensor comparison displays, sail line displays, cable shape displays, source and receiver group separation, receiver group track plots, network configuration displays, and network adjustment displays. Such system operates in batch and interactive processing modes and graphically edits sensor data.

Video displays 36, 46, 50 and other displays connected to the system comprise high resolution, large screen video displays for providing real-time graphical representation and viewing. Such displays can be connected to any subsystem shown in FIG. 1 and can simultaneously show seismic data on one screen, real-time binning on another, and navigation displays on another. To view large amounts of data in a compact space, seismic gathers can be packed into columns. A job can be selected and viewed more than once, and multiple run view windows on the same job can be pulled to perform simultaneous job comparisons. A buffer can hold the portion of the file in view, thereby maximizing the use of memory for viewing large files. Processing reports can include cut- and paste seismic or attribute plots, portions of job printouts or extracts from existing technical documentation.

Satellite network connections 28 and 48 provide full-time, high-speed network connections between the seismic vessel and other vessels or on-shore installations. Seismic data processors (not shown) can operate through satellite network connections 28 and 48 to execute PDL 10, SeisView 32, and Omega 42 and to initiate jobs, view quality control results, download reports, and to perform other functions. Compressed or uncompressed seismic, navigation and other data can be transmitted from the vessel to other installations through satellite network connections 28 and 48.

Detailed descriptions for specific system components follow.

2. Prospect Data Logger (PDL)

PDL 10 comprises an integrated data and system management system that stores all non-seismic Data and Attributes for use by the quality control, processing and report generation systems. PDL 10 stores non-seismic data in a relational database permitting high-level automation of routine acquisition functions, automates the generation of quality control and administrative reports, and manages deliverable tapes from both the acquisition system and processing functions. PDL 10 can access, identify, store and share Attributes for the entire exploration prospect or any portion thereof, thereby permitting survey-wide quality control and data analysis. Computer power and flexibility for the PDL 10 operation can be provided by an IBM SP-2 scalable, parallel processor or comparable hardware system. PDL 10 can drive quality control and data processing tasks through geometry assignment.

PDL 10 uniquely provides a central database for storing and processing all non-seismic data. Full-time, high-speed satellite network connections 28 and 48 from vessel to shore allow data, quality control results, intermediate processing outputs, and reports to be generated from and to be reviewed from remote, on-shore installations. The system provides comprehensive Attribute analysis, on-line quality control of all traces, automatic initiation of seismic quality control, and complete write-protection for high density media such as 3590 tapes. Paper output is significantly reduced because of real-time satellite network connections, large screen displays of seismic data instead of conventional plotters, and disk files in place of conventional reports. The system provides fully verifiable, quality-controlled coordinate-assigned and partially processed Seismic Data with little or no operator intervention. PDL 10 is connected to tape library 38 and to other system components to provide real-time control, seismic data processing, real-time navigation, and navigation post-processing functional capabilities.

PDL 10 automatically coordinates Seismic Data acquisition and storage with minimal user intervention. When PDL 10 senses that a raw data tape from tape library 38 is complete, PDL 10 unmounts and catalogs the tape volume and launches an initial processing task. In this fashion, PDL 10 automates initial field processing by automatically initiating processing sequences immediately upon availability of the required data. The initial processing task can create a duplicate of the field tape, verify seismic data quality, and extract prospect-wide Attributes for storage in PDL. Internally, PDL 10 furnishes automatic raw field tape playback for quality control, automated input to processing, automated acquisition and quality control for high-density media such as 3590 tapes, and automated line and survey parameter tracking. "Oracle" marketed by the Oracle Corporation provides a relational database which permits external systems such as Omega 42 with access to data within PDL 10. After the real-time or processed coordinate datasets are available, other processing tasks are automatically launched by PDL 10. For example, the Seismic Data and Positioning Data are merged and the merged data is checked for quality control.

In addition to other capabilities, PDL 10 provides the following functions:

1. Automated real-time quality control and analysis of data from the acquisition systems through the use of text and graphical displays;
2. Survey-wide quality control and analysis of onboard data via text reports and graphical displays;
3. Standard quality control and administrative report generation for users both onboard a vessel and in remote processing sites;
4. A centralized database permitting access to information by authorized users;
5. Uniform interface and standard reporting formats for information transmitted to administrative and processing sites;
6. Digital storage and retrieval of information to reduce paper dependency and to increase the effectiveness of end user information; and
7. Information output to seismic and navigation processing systems to enable the automatic setup of the data processing sequences.

Within PDL 10, a relational database management system coordinated by Oracle manages in-line and survey databases. All acquired data is automatically logged into a transient, separate line database. A permanent, survey database exists on disk storage for the duration of the survey acquisition time. After the line database has been completed, all configuration information and selected navigation and particular seismic Attributes are appended from the transient line database into the permanent survey database, thereby permitting the line database to be deleted or overwritten by a subsequent production line. Although survey databases may exist on disk at the same time, only one survey database is active at any time. PDL 10 provides a user interface which allows the allocation of disk space to line and survey databases, creation and deletion of line and survey databases, and the archival and restoration of line and survey databases.

Seismic Data in the form of SEG-D tape reel information is automatically logged in the PDL 10 database, and tape labels for cartridge tapes are created. PDL 10 maintains a record of all survey configuration parameters from acquisition systems integrated with PDL 10. Such parameters are stored in the line database, and any parameter changes are automatically detected and logged to a PDL 10 database. PDL 10 creates a single event log which combines messages from the printer output, single/dual observer log, PDL real-time quality control, and PDL operator comments, and a user can search or filter any seismic line in the PDL 10 database.

PDL 10 automatically performs shot-by-shot quality control on the navigation and seismic header data received. Basic Attributes including shotpoint, file number, and other data is checked against the corresponding values from the previous shot and for consistency between navigation, seismic and source systems. Any exceptions are recorded in an integrated line exception log, and information regarding the status of each shotpoint is recorded in a shot summary table.

PDL 10 automatically tracks basic production information for each line. Any Attribute in the PDL 10 database can be extracted and plotted over the extent of the survey through Omega Attribute display 50. A real-time communications manager permits PDL 10 to exchange data with other components within the system. To facilitate automatic expansion of the database without user intervention, PDL requires a list of directories. These include a survey directory list, a survey extent directory list, a line directory list, and a line extent directory list. As part of the database initialization procedures, different database global tables for performing administrative tasks are created. After the global tables have been established, distinct line databases must be created before data can be logged to the database. Because the size of a required database is not always known, PDL 10 automatically expands the database as data is being logged. After the global tables have been created and before data can be logged to the database, one or more survey databases must be created. Survey information for each database includes the client, the party number, area name, lease block, and measurement unit type.

PDL 10 logs data in real-time by communicating with recording room systems to collect data, to write incoming data into the PDL 10 database, to validate incoming data and write the results into the PDL 10 database, and to transmit data to other systems. A start-of-line signal is detected by PDL 10 to open the databases for logging, and an end-of-line signal from navigation is detected by PDL 10 to close the currently active databases in preparation for the next production line.

PDL 10 performs numerous linking tasks to other components in the system. An append survey function extracts selected information from each temporary line database for storage in the permanent survey database. User defined rules can extract selected information from a table in the line database, including compass, acoustic, cable depths or gun status. PDL 10 automatically logs all raw compass data for each compass and shot during a line. PDL 10 verifies whether a line has been added twice to the survey database and automatically deletes any existing line information before the new line information is appended.

PDL 10 maintains various logs within the database. A unified observer log permits a line to be selected for display, and various filter options can be selected. A regular log and a special event log is also maintained. Reports of such logs can be generated, and a production summary log edits, displays and printed reports of sail-lines and CDP lines in a selected survey. A spreadsheet provides information such as shipment, sequence number, first good shotpoint, first good FSID, last good shotpoint, last good FSID and status. Other line information includes editable fields including line type (prime/infill/reshoot), completeness of line, status, and charge type.

PDL 10 performs the function of seismic tape management where seismic tape information is stored in a heirarchical manner with a survey at the highest level. Each survey is divided into a number of data shipments which are further divided into boxes holding seismic reels. The tape management functions of PDL 10 permit the user to display and work with data at different levels, and seismic tape management menu permits a user to monitor tape reel information acquired during the survey. PDL 10 assigns each tape to a box, and the current box assignments are initialized before production begins. All tape information is written directly into the survey database when a line is being recorded. The tape management functions can create labels for the tape media and shipping and catalog information and listing. A catalog listing of tape media can be created.

One function of PDL 10 is to provide in-house seismic processors with specific line, parameter and tape reel information to automate job setups for seismic processing. A parameter file is created as a report from PDL 10, and selected parameters are extracted from the survey base tables. PDL 10 extracts relevant information from the survey base tables and creates a line summary report and a seismic reel report. Interactive database tools provide a user with direct access to all available tables within each line or survey database. An import/export facility provides the capability to move the database to a different workstation, and a catalog monitors the information transport.

There are three levels of tables in the PDL 10 database. Global tables belong in the PDL 10 account and describe lines, surveys, line extents, and survey extents used internally to create database files in specified directories. Survey tables belong to each survey database, and line tables also belong to each survey database. A primary key in the PDL 10 database is the field shot identifier. Secondary keys include vessel number and the system identification number. The tables within PDL 10 are used to create the Omega 42 flows and to provide parameters for the execution of those flows.

Each table can hold values useful as filter parameters in a statement, such as the rows based on shotpoint/time or seismic file number. If the PDL is logging data from multiple vessels or from multiple streamers, there will be more than one entry per shot cycle and the correct vessel number or system identification number must be specified. A table can contain event messages from the navigation log, the observer log, PDL generated event messages, or PDL operator comments.

The tape manager for PDL 10 mounts, write protects, and catalogs tapes for the recording systems, informs Omega 42 of reel changes, inserts tape copy information into the database, performs manual mount, dismount, retention, write-protect and catalog functions for field tapes, monitors box and shipment numbers, performs backup and restore tape functions, and performs import and export functions.

The tape manager for PDL 10 distributes tape related operations across three continuously running remotely operated call servers. These servers are identified as a tape controller, a tape operator console, and a tape catalog server. The tape catalog comprises two files identified as a file name database and a volume database. Each entry in the volume database contains fields such as the file name, serial number and status, record format and length, block size and count, creation date and system, and other information. The seismic file index viewer lists seismic files and their location, seismic file headers, and information on trace header contents.

The disk management system within PDL 10 includes a master for tracking all files in the system and for coordinating maintenance of the databases, a retrieve feature to restore archived files to disk and to delete stub files, an application programming interface layer to permit applications to communicate with the system for permitting retrieval and deletion of files, and an archiver for archiving files from disk into the system. Manual retrieval of disk files is eliminated, and files are automatically archived and updated.

Attribute display 46 includes numerous features including inter-process communication with an application executive, distance scales and direction pointers, rulers to measure the distance and azimuth of a line segment, references to structured file literals by name or by description, display of point count or distribution on a color legend, error handling for faulty literals and for faulty indexes for multi-valued literals. A gamma correction is applied for color plotting.

Details for tape management are shown in FIG. 3 for three different job flows. Seismic acquisition system 22 transmits data to SeisView 32 and to tape management system 34. As shown in FIG. 3, Job Flow A automatically starts when the acquisition system completes a tape. The data is transmitted and recorded as raw field tapes, which are read, copied and stored as field tape duplicates. An intermediate tape is written to another tape drive for intermediate processing. During Job Flow A, read-after-write verification is performed, tape quality control is verified, Attributes are generated, and the rms and peak and average amplitude are determined. If desired, the data can be resampled and the Attributes can be displayed.

Job Flow B automatically starts when the geometry data are available. Data is received from the intermediate processing step and is transmitted in merged SEG-Y form to another tape drive. During Job Flow B, the data are merged and sorted, a geometry update is performed, geometry quality control is performed, Attributes are generated, and a near-trace cube can be developed.

Job Flow N relates to full seismic processing capabilities from the vessel of on-shore facilities. Job Flows A, B and N can be controlled from the vessel or from on-shore through satellite communication network 28. Data in final merged SEG-Y form is available for complete processing regarding Seismic Data and Position Data, and can be transmitted to processed data tapes for storage. As described herein, Job Flows A, B and N comprise illustrative examples. In actual operation, each Job Flow would be customized to the particular Job requirements.

Within PDL 10, a tape manager provides real-time tape management to mount, retension, write-protect and catalog tapes for the recording systems. The tape manager informs the Omega 42 server of reel changes, inserts tape copy information into the database, tracks box and shipment numbers, performs backup and restore functions to tape, generates tape labels, and performs import and export functions.

PDL 10 uniquely provides enhanced quality control capabilities by monitoring seismic data and positioning data inputs and storage on a real-time basis, by monitoring data merged from these sources, and by generating commands to store and display data and to automatically initiate additional data processing and transmission. These automated capabilities provided by PDL 10 provide a fully automated system which detects errors in individual shots, variances in tape quality and positioning data parameters, performs read-after-write verification of tape quality, and monitors merged data. Because PDL 10 permits system adjustments on a real-time basis, the need for reshooting seismic lines is reduced, positioning errors are corrected to reduce data processing corrections, and data processing procedures are expedited. PDL 10 automatically performs the programmed functions, thereby reducing operator intervention and the possibility of operator induced errors. This feature alone significantly enhances overall quality control efficiency for the entire system.

3. Omega Seismic Processing System

Omega 42 organizes all of the data involved in the processing of a survey, from geophysical documentation to processing sequences, quality control information and the Seismic Data and Attribute Data itself, into a heirarchical system of databases. Omega 42 facilitates processing on a local workstation or workstation server executed locally or on a more powerful remote computer server or supercomputer. Each job may be executed immediately or can be submitted to job queues. Jobs can be monitored through a JobVu interface, and the resulting printout can be previewed through a printout viewer such as display 50 regardless of where the job was executed.

Omega 42 incorporates a project manager which comprises a graphical organization tool provided to define and manage all components of this heirarchical system. The project manager is a graphical organizational tool that enables definition for the project components. The project manager provides functions to create and edit a general database index and resource database index, and to define prospects, surveys, or lines.

A database index identifies the databases required by Omega regardless of the prospect or survey being processed. Representative databases include an error database, seismic function module documentation release, application documentation release, data dictionary database, help database, system-defined macro database, geometry database, seismic file index database, geophysical language set-up database, and a resource database index. A prospect database contains the names of the databases that vary from prospect to prospect as defined by a cartographic file, environment directory, and a survey list. A survey database index contains the names of the databases that vary from survey to survey, and include a seismic file index database, a geophysical language set-up database, a line list, survey specific directories, macro documentation related to the survey, and a survey-defined macro database. The line database index contains line-specific data that varies from line-to-line, including seismic data in the structured file format, seismic data in the SEG-Y format, seismic data in the SEG-D format, geophysical language files, velocity files, statics files, a target directory for job printout, and geometry files.

The geometry database is an Attribute file and determines the spatial relations of a seismic survey. Such relations are either relative, such as shot-detector offsets, or are absolute, such as seismic line location. Spatially related information stored in the geometry database can be transferred into seismic files, or used for computation of other geophysical parameters. Multiple seismic lines can be stored in and retrieved from a single geometry file. Survey geometry information stored in a geometry database consists of shot information such as shot identifiers, shot X-Y coordinates, shot elevations, uphole times and statics, receiver information such as receiver X-Y coordinates, elevations, statics, and shot-cable cross-reference information such as spread patterns description.

Geometry tables that can be generated in a geometry database include a line table, source table, detector table, pattern table, subsurface table, profile table, and exception table. The line table contains typical data literals such as line name, datum elevation, replacement velocity, number of line shots, and others. The source table includes single dimensions including the shot sequence and shot station number, and further includes information such as shot coordinates, elevations, uphole times and gun depths. The detector table contains single or multi-element common or data literals including coordinates, elevations, and water depth. The pattern table contains shooting configuration descriptions and dimensions. The subsurface table contains information pertaining to subsurface gridding of the survey area and further includes data literals having information regarding surface and subsurface locations. The profile table is used internally for geometric definition generation, the cable table is used for marine seismic surveys and contains streamer cable positioning information, and the exception table contains information such as killed or reversed traces within shot records, receiver stations inaccessible for planting detectors, killed or reversed shot records or receiver stations and other information.

Each seismic function module can be linked with a job through an administrator program in Omega 42. Alternatively, the user can create a separate file or can link the file at a later date. Omega 42 further permits subsystems to be compiled individually or all at once, permits linkage of executables, and permits creation of databases individually or simultaneously.

Omega 42 contains a media management system having different components. Tape management functions provide a tape catalog to track file names and volume serial numbers, support for labelled tape processing, and a central operator console to process tape mount requests. The tape catalog automatically provides serial numbers for input and output tapes, prevents files from being uncataloged, maintains files in the proper order, and prevents inadvertent overwrite of data. The tape management operator console can process tape mount requests for Omega jobs running on one or more systems in a network.

Omega 42 includes various functions and capabilities such as 3-D trace interpolation using spatial aliasing or non-spatial aliasing techniques, 3-D random noise attenuation to reduce random noise and attenuate nonlinear noise and increase the continuity of events, 3-D survey trace select to produce different output trace forms, averaging corresponding traces from multiple CMPs to form an average CMP, weighting and summing overlapping or non-overlapping sets of adjacent traces, attribute generator to extract and analyze information from trace headers and outputs so that the attributes in the output file can be displayed through an Attribute display, color coding for display or comparison to identify difference traces, datum correction to apply time corrections to seismic data to move data to a desired datum or to obtain datum correction time-shift values from the trace headers of the input data, deconvolution operator application to apply filter operators to seismic data. The number of input operators is unlimited. With the deconvoluton operator design, input autocorrelations or spectra are used to design different types of deconvolution operators. Depth focusing analysis rotation provides horizontal coordinate transformation to depth-error, and migration-depth axes is performed on data supplied by the system to perform pre-stack f-x depth migration. With the depth migration velocity update, time/depth information is read from the trace headers of the output to create either an updated velocity file suitable for the next interaction of the prestack depth to file, and a time-velocity function from an external file converts a seismic depth section to time. F-X depth migration or a constrained depth-error generates a focal surface image.

A time-velocity function from an external file converts seismic depth section to time. DMO merge, backup, output, split and join functions operate to join soft boundary DMO progressive files with optional DMO weight application and output, to produce tape backups, to split the merged result into signal and DMO components, to join such components with the application of DMO weights, and to output backups and merged result files to tape. In DMO x-t build, a progressive stack file is built, velocity monitor gathers can be defined, a dip weight table can be created, and a statistics file can be created. DMO x-t stack, dip move-out correction is performed with a space-time Kirchhoff algorithm. The input data, typically shot gathers or CMP gathers or common offset gathers are NMO-corrected seismic traces to which static corrections and mutes have been applied. Either progressive stack or common-offset operating options can be used. In EGRM 2-D refraction statics, refraction-time and refraction-velocity information are extracted from a data set of first break pick times, and statics are computed for application to reflection data. Exponential gain- input data are scaled with an exponential gain function for each sample in the trace. An extended Stolt method of time migration algorithm migrates stacked data in 2-D or 3-D form. A geometry extract can identify geometry from input seismic trace headers to create a geometry database.

An f-x migration algorithm uses an infinite finite-difference formulation of the 45-degree scalar wave equation modified for 65-degree and 80-degree approximations in the frequency-space domain. The output is 2-D or 3-D time-migrated or depth-migrated data. Multiplexed field tapes, demultiplexed SEG-D formats and other formats are copied, tape density can be changed, and selected files can be copied.

Geophysical language routines are used by seismic function modules within Omega 42 to job build information to define resources and parameters related to running a job, geophysical processing information to define geophysical processes, the parameters for each seismic function module, and the order of processing. The geophysical language routines include seismic function module names, parameter and parameter set names, parameter values, labels, directives, comments and job build parameters. Parameters are grouped together and certain options are selected by the use of parameter set names. Labels are used in the geophysical language to direct the output from one seismic function module to the input of another. Input reads a data trace, passes it to a filter and on to display. Alternatively, the data may be passed from one input to different processing streams.

4. Expedited Preliminary Data Processing

The system uniquely expedites Seismic Data and Positioning Data processing by automatically performing certain processing steps when the input data becomes available. For example, field tapes are verified, field tape copies generated, geometry assigned, and seismic and geometry quality controls are performed. A geometry button invokes a geometry quality control application which permits the data to be viewed and edited graphically or in spreadsheet form. A grid utility button permits computations to construct and manipulate grid coordinate systems used in processing 3-D seismic surveys. A computer aided plotting system permits access to function modules to build, position, scale and display a combination of graphics and to create a customized plot of seismic data.

In flex 2-D computation, traces may be stacked into more than one CMP to adjust the source-to-source detector distance distribution within CMPs so that each source-to-source detector distance range contributes adequately to the final stack trace. Values are read from a midpoint table, flexed, then outputted to the midpoint table for use later by seismic function modules such as a midpoint table merge-to-seismic module. A flex table created by a flexbinning routine creates a flex table seismic function module that can be updated by adding or subtracting traces from individual cells.

Various filters can provide certain processed data results. A general purpose time-variant filter provides zero-phase or minimum-phase convolution filter operators that are constructed and applied according to user passband constraints, and may vary temporally or spatially. A generalized radon transform filter provides forward or reverse radon transforms along parabolic, hyperbolic or linear trajectories to remove undesirable events such as hyperbolic water bottom multiples. A graph of seismic structured file data is produced, and the sort order can be set for the grid pattern. An input flex table creates seismic trace headers from information from the flex table. A multi-channel dip filters can be designed in the frequency-wavenumber (f-k) domain by specifying either a fan-shaped region using velocities or seismic dips (ms/trace) or a polygonal region defined by a set of f-k points. Each filter can be Fourier transformed to the time-offset (t-x) domain to be temporarally and spatially truncated and tapered, or may be applied in the f-x or t-x domains.

With a midpoint table generator, values are extracted or computed from the input trace headers and are copied to a random access midpoint table which stores information for first break analysis or 2-D flex computation. Values can be copied from the midpoint table into seismic trace headers, and can be used to delete or reverse traces and to control the duplication of traces. Trace header values can be copied from one seismic file to another regardless of the trace order of either file.

A multi-channel template provides a template for seismic function traces that perform an operation on a gather of traces. Input traces are accepted one at a time until the gather is complete, and the traces can be output one at a time. A nonlinear-to-linear matrix scale conversion comprises a table of time-constant values created from a table of time-variant values. A subset of multiple velocity function stack traces is interpolated from the traces output by the internal gather cross-correlation. Subsequently, a stack panel picker application can be performed in the velocity analysis processing.

An optimum prestack trace weighting routine permits user supplied zero-offset times and velocities of the primary and multiple events, together with source geometry information, to generate a synthetic dataset whose events are comprised of Ricker wavelets. The auto-correlation of these synthetic traces compute coefficients such as trace weights which optimally suppress long period multiples when applied to seismic data during CMP stacking. Output seismic data traces and their corresponding headers to a file where the contents can be tailored by specifying the literals to output, by excluding the literals from output, and by truncating traces to a specified maximum reflection time.

A poststack trace interpolator permits spatial interpolation of traces to yield constant trace spacing within a 3-D grid or along a 2-D profile, including adjacent traces that have been time-variantly shifted to line up at the angles (dip directions or maximum coherency are summed. A secondary output is the picked dips file, which can be displayed for quality control assurance.

A reflection statics computation permits reflection pick times to be accepted from the cross-correlation picking of reflection times, then Gauss-Seidel iterative decomposition can be used to derive source residual static terms, detector residual static terms, structural terms, and residual normal move-out terms. Delay times and refractor velocity information are extracted from the pick times, a refractor model is built from this information, and refractor statics are computed from this model.

A relative trace balance provides a single factor for each gather (prestack data) or line (poststack data), or a single factor for the entire file to invariantly scale the data. The scale factor is computed based on the rms amplitude of the selected trace or traces. A residual amplitude analysis/compensator analyzes and compensates for residual amplitude decay in seismic data separately or in a single run. A focal surface image output by a prestack image compositor is depth corrected using information from a depth-error file. A root mean square (rms) amplitude gain is applied to seismic traces.

All SEG-D demultiplex and multiplexed field data is input, and SEG-Y data can also be accepted as input. Seismic data traces and their corresponding trace headers are output to a SEG-Y format file or to an intermediate structured file. To plot Seismic Data, such data is accepted and outputted to a CGM-formatted file for plotting. The system can then overlay a graph of trace header literal values and plot polarity change marks and velocity change marks.

A spatial parameter interpolator can convert an irregular random grid of values from a spatial parameter file to a regular sparse grid of values. The output can comprise another spatial parameter file.

Spectral estimates can be derived from any seismic data, and the output spectral analysis data types include auto-correlation, power spectra, low power spectra, complex frequency domain components, auto-regressive series, complex Thomson eigenspectra, Thomson power spectra and logarithmic spectra. The spectral analysis frequency domain components may be generated by direct, indirect, or auto regressive methods.

The traces in a gather can be stacked, and the resultant trace can be normalized sample-by-sample. Start times may be automatically determined by trace amplitude or may be entered by the user, and velocities are used even if a zero offset is encountered. Statics trace header values are updated by one of two methods—output statics comprise the sum of the supplied statics and the original trace header statics, or all input trace header statics are zeroed and replaced with the supplied statics.

A surface consistent amplitude compensation application can balance amplitudes within a window in a surface-consistent manner. Decomposed statistics are used to calculate source, detector, and offset gather balance factors. The balance factors are used to scale input traces. A source-consistent deconvolution spectral decomposition can decompose an input dataset of logrithmic power spectrum amplitudes into source, detector, midpoint and offset components. A roll-along and gather sort is available, and is based on trace header literal values. The roll-along sorts data from one gather type to another (primary sort) and sorts the traces within each gather (secondary sort), then the gather sort reorders the traces within each gather.

A geometry database can be created or updated from text (ASCII) survey records. A time-velocity function from an external file converts seismic time section to depth. A time-variant spectral analysis on a single trace or an entire file is done by Fourier transform. Outputs may be 2-D or 3-D or power and phase spectra. Trace header values from a secondary input can be merged with a primary input, and systematic, flexible changes may be made to any trace header literal. Trace header values from a secondary input are merged with a primary input, and a separate scale factor can be applied to each trace so that the maximum absolute amplitude on all output traces has the same value. Seismic trace headers can be updated with information from a geometry database.

A velocity function processor provides a velocity file which may be accessed by other modules. No seismic data is input in this process, and no interpolation, scaling or modification is performed to the velocity file. A velocity file is created from user parameters and a file of velocity traces. A zone anomaly process application performs another seismic function module for zone anomaly processing, where trace amplitudes are adjusted in a surface-consistent manner to reduce noise. Three files are input, including the seismic data input to zone anomaly process pick, the pick file output by zone anomaly process pick, and the decomposed statics file output by zone anomaly process iterative technique. The input pick file of logarithmic amplitudes can be decomposed into the effects of source, receiver, offset, and geology terms. Zero or minimum phase filters are applied to time zones on selected traces.

Omega 42 implements a wide area network divided into a description, a system administration section, and a user's section. A local area network environment allows remote machines to share file systems used by Omega 42 jobs by cross-mounting the file systems on each machine. The wide area network operates in a batch submission mode which requires all input and output disk files before the batch submission script is generated. An Omega 42 batch job generates a script that contains sections set up in the Omega environment, creates directories, and copies files to the executing machine. An input file is copied from the submitting machine to the executing machine, and all output files are written to the executing machine. These capabilities are coordinated across the entire satellite network to provide operational control and information sharing from different locations. The remote job execution allows processing facilities to be spatially distributed in a world-wide sense but still allows processing jobs to be submitted from any location on the computer network.

Seismic function modules within Omega 42 include 2-D fast Fourier transform, 3-D frequency domain trace interpolator, 3-D random noise attenuator, 3-D region definition, 3-D survey merge, 3-D survey trace select, 3-D time slice create, 3-D time slice transposition, and adjacent CMP sum. An interactive macro builder allows creation of a single module that applies options from one or more seismic function modules to the data. The module appears as a customized seismic function module that can be included in any Omega 42 job. Macros can be used to standardize processing sequences and simplify parameter selection, and can specify parameter defaults which require no user interaction or can otherwise prompt user data entry. Specifically, the interactive macro builder allows the user to define and modify macro modules, specify seismic function module parameters, customize the macro parameter set-up, specify the directory in which to store a new macro, copy a macro to another directory, specify the seismic function module palette category in which to store the macro, edit and delete a macro. If no macro directory is established, the interactive macro builder creates one automatically and edits the survey database index. Macros can comprise stand-alone processing flows or can be called into a larger processing flow. Multiple macros can comprise the entry seismic function module, and any seismic function module can comprise the exit seismic function module.

The global parameter database communicates with PDL 10 and reduces duplication in the job set-up for prospects and surveys requiring constant input values for multiple lines. Parameter values can be customized for a complete prospect or survey while tailoring specific values for individual lines requiring special processing techniques. The global parameter database permits the creation of a single geophysical language template for a process or group of seismic function modules into which survey, line, prospect and write-up defaults are substituted. Once the global parameter database is set-up and verified, a processing template can be applied to multiple lines of data with less user input, saving time and reducing errors. PDL 10 can be used as a data source for template generation within the global parameter database.

From display 50, seismic data and output from a seismic function module can be displayed. From the displayed data, display parameters may be changed, tools can be selected to show data attributes, and parameters can be determined for further processing. Specifically, the output data determines the interactive processing steps to be taken. A tools menu provides options such as toggle timing lines, linear velocity, movie, spectra, compare, horizon picker, window definition, and literal overlay. As a representative example, the linear velocity tool determines velocities of events in the seismic data and the magnitude of the velocity can be represented by the slope of a line segment. A compare tool permits two data sets to be compared in different ways.

The seismic file index serves as a catalog of every seismic structured file in the prospect/survey. Display 50 provides an interactive tool that permits viewing of a seismic file content and the ability to add or delete seismic file information to or from the seismic file index.

5. Enhanced Quality Control

The system uniquely provides real-time quality control over data acquisition, storage, processing and reporting.

SeisView 32 provides on-line, real-time quality control of the Seismic Data as such data is acquired. In addition to interactive data-driven processing of seismic data, Omega 42 provides tools for interactive quality control and parameter selection. Representative tools include Attribute generation and display applications and error analysis. Numerous error codes alert a user to non-standard events. Examples include problems in reading, retrieving, duplicating or archiving a file request, improper file information, data storage, or other functions. With an identification header modifier, trace length is verified as at least one sample before allocating memory to the seismic trace. An input provides an error message if the first 500 records are not complete. Another input sets an error flag if the number of disk or tape read errors exceed ten.

Positioning Data is also verified by the system on a real-time basis. Source location and cable location information from Positioning Data is used to extract geometry information, and such information can be stored in a survey geometry database. An internal gather cross-correlation/velocity analysis applies linear or hyperbolic move-out and cross-correlating traces within CMP gathers at user definable velocity functions. The velocity functions can be time-variant to define a corridor within which the correlations are computed, and stacked data can be output. An inverse Q-filter compensates for the earth Q-filter such as attenuation due to high frequency loss and travel-time, and time-variant phase and amplitude compensation is applied using a Futterman frequency constant-Q model of earth attenuation. Prestack or poststack data can be compensated for depth and lateral variable Q. Additionally, a Kirchhoff summation migration—prestack or poststack, 2-D or 3D time migration can be performed. A marine geometry application supplies the user with information about the geometry used for marine data acquisition. Such data can be collected in tables, checked for consistency and transferred into the seismic trace headers.

In a prestack f-x depth migration application, shot-ordered data can be migrated to produce a depth focusing analysis data volume. Such data can be used to create depth sections and measure and correct errors in the input velocity field. With the focusing error measurements and such data, a corrected depth section may be produced without the need to re-migrate.

In a prestack image compositor application, a focal surface image is created from the multiple depth-error panels migrated by the prestack f-x depth migration for a given depth-error function derived with depth focusing analysis. A radial predictive filter can cross-correlate surrounding traces to find the best shift, traces are then shifted and stacked to determine the output trace. A random noise attenuator can split the input data into its predictable part which contains the signal, and into its unpredictable part containing random noise. This feature reduces random noise, increases continuity of events and attenuates nonlinear noise.

A seismic trace toolkit application comprises one of several functions which can be applied to seismic traces. Test data such as sine waves, simple spikes, random noise or seismic attribute sections can be created.

In a single station x-y recomputation application, the source x-y coordinates for shot gathered data or the detector x-y coordinates for detector gathered data are recalculated, one gather at a time, using a statistical prediction filter. The recalculated source/detector x-y coordinates can be written to a geometry database and to the appropriate trace header literals. Source and detector coordinates can be computed with an optimal, non-linear Kalman filter, and the corrected source detector x-y coordinates can be written to a geometry database.

The amplitude spectra of seismic traces within a user specified frequency band can be time-variantly flattened, and amplitudes at frequencies outside this band can be suppressed. Error messages can be sent if filters are manually specified and frequencies are either not within the anticipated ranges.

The user may specify a gather type on which to work and may specify deletion or polarity of a trace or a group of traces. If a seismic function module is not present in a flow, output showing number of traces deleted, reversed, unchanged or processed will equal zero. If a range of values is given, the last value can be less than the first without an increment between the two. The velocity analysis provides a check for negative pick times. If a pick has a negative time, it can be reset to zero time.

A multi-step flow driven system for processing seismic module functions allows immediate job submission. A JobVu facility engaged with Omega 42 monitors the processes or jobs currently executing on any machine in the network. Each machine is monitored by default, however one or more machines can be selected from a scroll list. The primary use of the JobVu facility is to monitor the status of executing Omega 42 jobs. Trace count and CPU memory are displayed. A running job can be deleted or the flow associated with a running job can be viewed.

A velocity manager furnishes a subroutine which returns the number of control point functions in a 3-D file. This value primarily computes the amount of storage needed to hold the primary and secondary sort indices that identify the functions in the 3-D file. Control point identifiers for a 3-D velocity file created by the spatial parameter interpolator are identified by primary and secondary sort indices. An error message can be displayed if the seismic function module parameters are out-of-date with the current seismic function module documentation, and a command automatically conforms the data to the new documentation.

The present invention provides an integrated seismic data collection system for processing geophysical and navigation data in an exploration prospect. The invention includes a prospect data logger in communication with all system components for identifying and storing prospect wide attributes and for expediting data processing. Seismic data from a seismic acquisition system is transmitted to a seismic data storage linked with a seismic data processor. Positioning data from a marine navigation system is transmitted to the prospect data logger. The prospect data logger manages the seismic data storage and automatically initiates data processing as data becomes available. The raw seismic data and positioning data is contemporaneously merged, the merged data can be monitored through displays or reports on a near real-time basis, and data processing and transmission can be controlled from remote locations through a satellite network connection. The system significantly expedites data processing and reduces data processing errors.

The system reduces systematic errors attributable to data transfer and permits prospect wide attributes to be extracted, stored, and used in data processing. The unique interactive capabilities of the system provide significant user flexibility and enhance data quality. Systematic processing errors are reduced because the system automatically and continually verifies the accuracy and consistency of data input and the processed results. When errors attributable to data gathering procedures are detected, prospect data logger 10 can automatically generate signals to navigation system 14 or to seismic acquisition system 22 to correct the error source.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An automated quality control system for processing geophysical seismic data from a seismic acquisition system, and for processing positioning data from a marine navigation system, comprising:

a seismic data storage engaged with the seismic acquisition system for collecting and storing the seismic data;

a seismic data processor engaged with said seismic data storage for processing the seismic data;

a prospect data logger in communication with the marine navigation system for accessing the positioning data, in communication with said seismic data storage for accessing the seismic data, and in communication with said seismic data processor for coordinating seismic data processing by said seismic data processor, wherein said prospect data logger is capable of accessing attribute data relevant to the seismic data and the positioning data; and a terminal communicating with said prospect data logger for permitting commands to be communicated to said prospect data logger.

2. A system as recited in claim 1, further comprising a display engaged with said prospect data logger for illustrating data accessible by said prospect data logger.

3. A system as recited in claim 1, wherein said prospect data logger is capable of storing data in a format selectively programmed into said prospect data logger.

4. A system as recited in claim 1, wherein said seismic data processor is capable of extracting selected attributes from the seismic data stored in said seismic data storage and is capable of communicating said attributes to said prospect data logger.

5. A system as recited in claim 1, further comprising a remote terminal and a satellite network connection for providing communication between said remote terminal and said prospect data logger.

6. A system as recited in claim 1, wherein said seismic data processor and said prospect data logger are capable of cooperating to merge positioning data stored by said prospect data logger with seismic data processed by said seismic data processor, and of verifying the selected format of such merged data.

7. A system as recited in claim 6, wherein said prospect data logger is capable of generating a command if the merged positioning data and seismic data does not meet selected parameters.

8. A system as recited in claim 1, further comprising a processor for monitoring the geophysical seismic data from the seismic acquisition system, wherein said processor is capable of generating commands to said seismic acquisition system if the seismic data does not meet selected parameters.

9. A system as recited in claim 1, wherein said seismic data storage includes a storage tape for receiving and storing seismic data input, and wherein said prospect data logger is capable of conducting read-after-write verification for the quality of said tape immediately after selected seismic data is written to said tape.

10. A system as recited in claim 1, wherein said seismic storage includes a tape for receiving and storing seismic data from the seismic acquisition system, and wherein said prospect data logger is capable of commanding said seismic data processor to access a tape to perform quality control processing for selected seismic data immediately after such seismic data is written to the tape.

11. A system as recited in claim 10, wherein said prospect data logger is capable of cooperating with said seismic data processor to perform quality control processing for seismic data inputted to the tape.

12. A system as recited in claim 10, wherein said prospect data logger is capable of automatically delivering an error signal to said terminal if said quality control processing detects a selected condition in the seismic data.

13. A system as recited in claim 11, wherein said prospect data logger is capable of automatically delivering an error signal to said terminal if said quality control processing detects a selected condition in the quality control processing performed by said seismic data processor.

14. A system as recited in claim 1, wherein said display is capable of illustrating an error in quality control processing performed by said prospect data logger and said seismic data processor.

15. A system as recited in claim 1, wherein said prospect data logger in conjunction with said seismic data processor is capable of performing real-time quality control processing for all seismic data and all positioning data in the entire prospect as the seismic data and positioning data is transmitted to said prospect data logger.

16. A system as recited in claim 1, wherein said prospect data logger is capable of transmitting a control signal to the seismic acquisition system and to the marine navigation system when said prospect data logger detects a selected data condition.

17. A system as recited in claim 16, wherein said prospect data logger is capable of generating and storing a record of said selected data condition.

18. A system as recited in claim 1, wherein said prospect data logger is capable of transmitting control signals to the seismic acquisition system and to the marine navigation system when said prospect data logger detects a selected condition in the attribute data.

19. A system as recited in claim 1, further comprising a seismic trace test application within said seismic data processor which is capable of automatically accessing seismic data within said seismic data storage to construct real-time quality control tests for the seismic data.

20. A system as recited in claim 1, further comprising a database engaged with said prospect data logger, wherein said prospect data logger is capable of automatically recognizing parameter changes in said marine navigation system, said seismic data storage, and said seismic data processor, and said prospect data logger is further capable of logging said parameter changes to said database.

21. An automated quality control system for processing data from an exploration prospect, comprising:
   a vessel;
   a seismic acquisition system for collecting geophysical seismic data;
   a marine navigation system for generating positioning data from the location of said vessel and the location of said seismic acquisition system;
   a seismic data storage engaged with the seismic acquisition system for collecting and storing the seismic data;
   a seismic data processor engaged with said seismic data storage for seismic processing of the seismic data;
   a prospect data logger in communication with said marine navigation system for accessing the positioning data, in communication with said seismic data storage for accessing the seismic data, and in communication with said seismic data processor for coordinating seismic data processing by said seismic data processor, wherein said prospect data logger is capable of identifying and storing attribute data relevant to the seismic data and the positioning data; and
   a terminal communicating with said prospect data logger.

22. A method for processing geophysical seismic data and for processing navigation positioning data relevant to an exploration prospect, comprising the steps of:
   collecting seismic data with a seismic acquisition system;
   transmitting said seismic data to a seismic data storage engaged with a seismic data processor and a prospect data logger;
   collecting positioning date with a marine navigation system;
   transmitting said positioning data from said marine navigation system to said prospect data logger;
   operating said prospect data logger to identify and store attribute data relevant to seismic data and positioning data from the exploration prospect; and
   automatically operating said prospect data logger to initiate data processing by said seismic data processor when said prospect data logger detects a selected seismic data event within said seismic data storage.

23. A method as recited in claim 22, further comprising the step of operating said prospect data logger to manage said seismic data storage and to control the recordation of said seismic data.

24. A method as recited in claim 22, wherein said prospect data logger operates said seismic data storage to write-protect data storage media within said seismic data storage.

25. A method as recited in claim 22, further comprising the step of operating a display engaged with said prospect data logger to illustrate data accessible to said prospect data logger.

26. A method as recited in claim 22, further comprising the step of operating said prospect data logger from a remote terminal engaged with said prospect data logger through a satellite network connection.

27. A method as recited in claim 22, further comprising the step of operating said prospect data logger in cooperation with said seismic data processor to automatically merge said seismic data and said positioning data.

* * * * *